No. 626,912.           Patented June 13, 1899.
D. D. KIMBERLIN.
POTATO BUG DESTROYER.
(Application filed July 8, 1898.)
(No Model.)
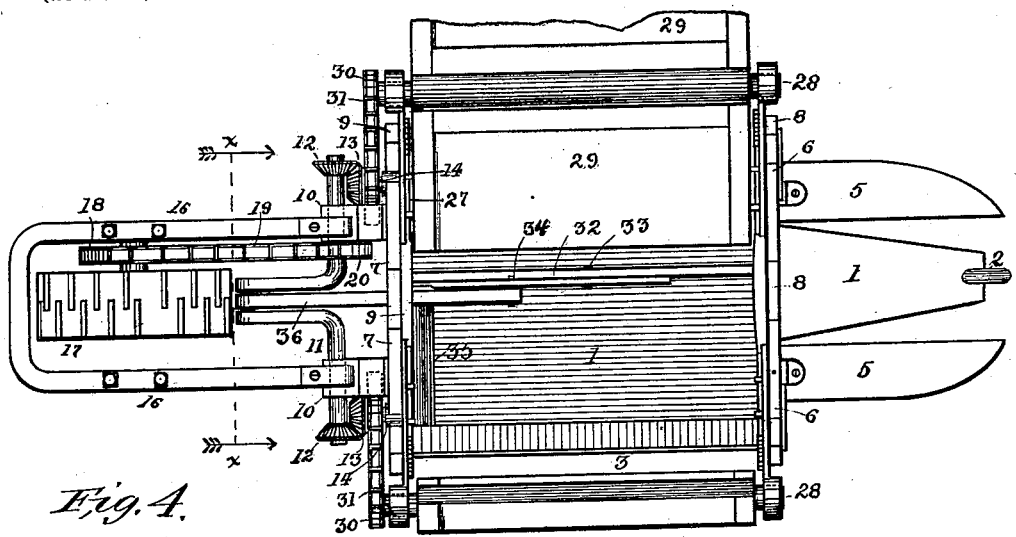
Fig. 4.
Fig. 1.
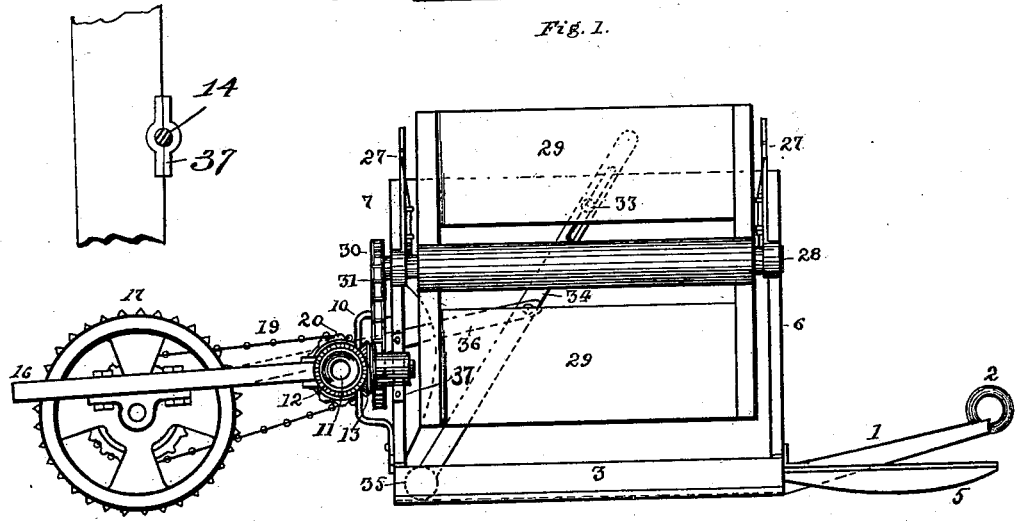
Fig. 2.
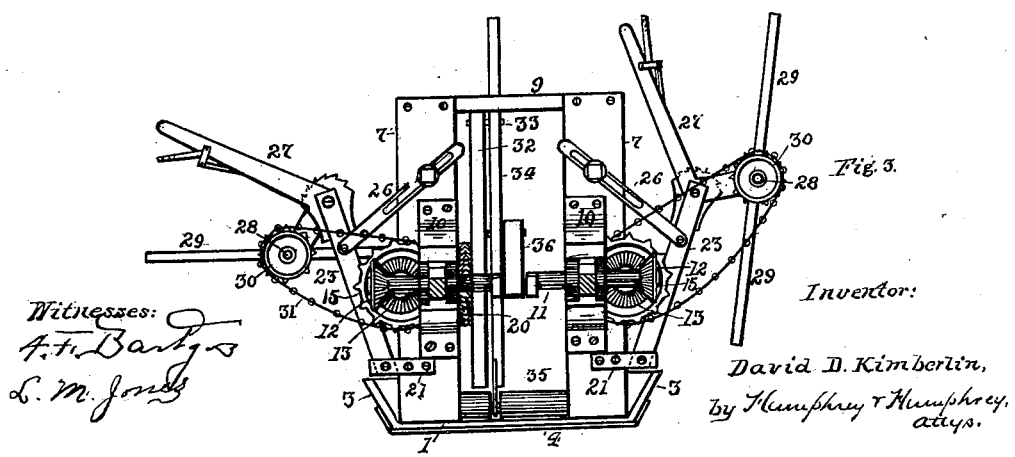
Fig. 3.
Witnesses:
F. F. Barty
L. M. Jones
Inventor:
David D. Kimberlin,
by Humphrey & Humphrey,
attys.

UNITED STATES PATENT OFFICE.

DAVID D. KIMBERLIN, OF HUDSON, OHIO.

POTATO-BUG DESTROYER.

SPECIFICATION forming part of Letters Patent No. 626,912, dated June 13, 1899.

Application filed July 8, 1898. Serial No. 685,392. (No model.)

*To all whom it may concern:*

Be it known that I, DAVID D. KIMBERLIN, a citizen of the United States, residing at Hudson, in the county of Summit and State of Ohio, have invented a certain new and useful Improvement in Potato-Bug Destroyers, of which the following is a specification.

My invention has relation to improvements in machines for catching and destroying potato-bugs; and it has for its object the construction of a machine to be drawn along and between the rows of growing potato-plants which shall by means of suitable devices shake the plants, dislodge the bugs, and drive them into the machine against a screen-wall, whence they fall on a floor and are crushed by a reciprocating roller, the several parts being arranged to be operated by a driving-wheel and to simultaneously coact to accomplish the result.

To the aforesaid objects my invention consists in the peculiar and novel construction, arrangement, and combination of parts hereinafter described and then specifically pointed out in the claims, reference being had to the accompanying drawings, forming a part of this specification.

In the accompanying drawings, in which similar reference-numerals indicate like parts in the different views, Figure 1 is a plan of my machine; Fig. 2, a side elevation, and Fig. 3 an end elevation looking from the section-line $x\ x$ of Fig. 1. Fig. 4 is a detail drawing.

Referring to the figures, 1 is a central bottom of the machine, which is tapered at the front and bears a ring 2 to which to attach the horse. Attached to the bottom 1 are sloping side boards 3 3, strengthened by a metallic plate 4, and to the front of each side board 3 is hinged an extension-board 5, with its outer edge curved inward to a point and free to be raised upward when desired. At the front and rear of the bottom 1 and firmly connected with it and the side boards 3 are upright boards 6 7, united at their tops by cross-strips 8 and 9, respectively, and constituting a framework to support certain working parts hereinafter described. On the rear upright 7 are strap-brackets 10, which bear journal-bearings for a horizontal crank-shaft 11, which bears at its ends bevel-gears 12, that mesh in bevel-gears 13 on shafts 14, journaled in brackets 37 on the outer edges of the uprights 7, and these shafts bear at their front ends sprocket-wheels 15. Hinged on crank-shaft 11 is a curved frame 16, in which is mounted a driving-wheel 17, arranged to run on the ground and on whose shaft is a sprocket-wheel 18, arranged by means of a sprocket-chain 19 to drive a sprocket-wheel 20 on the shaft 11. Pivotally hinged near the bottom of the uprights 6 7 by means of straps 21 22 are upright supports 23 24, adjustably secured by slotted straps 25 26, arranged to be secured by bolts and nuts. In the upper end of each support 23 24 are pivoted bell-crank levers 27, each provided with a retaining pawl and ratchet and on each side bearing between their shorter ends a shaft 28, provided with an elongated hub with radial arms and fan-blades 29. The rear ends of the shaft 28 are provided with sprocket-wheels 30, connected with the wheels 15 by chains 31.

Near the center of the machine and firmly secured therein is a vertical longitudinal partition 32, reaching nearly to the floor, and in this partition is a bolt 33, on which is a slotted lever 34, bearing at its lower end a roller 35, arranged to travel reciprocally across the floor and operated by a pitman 36, journaled on the crank of the shaft 11.

In operation the machine is drawn between the rows of growing plants, the fans strike the plants, and the bugs falling therefrom are driven inward onto the floor of the machine, where they are crushed by the reciprocating roller.

I claim as my invention—

1. In a potato-bug destroyer, the combination with a vehicle having a central floor to receive the bugs, of a roller arranged to reciprocatingly traverse said floor and, a mechanism, such substantially as described to operate said roller.

2. In a potato-bug destroyer, the combination with a vehicle having a central floor to receive the bugs, of lateral fans to drive said bugs onto said floor, and a roller to traverse said floor to destroy said bugs, substantially as shown and described.

3. In connection with a potato-bug destroyer having a platform to receive the bugs, and a reciprocating roller to destroy them, of folding advance wings adapted to engage and jar the plants, substantially as shown and described.

4. In a potato-bug destroyer the combination of the following elements; a floor with sloping sides to receive the bugs; lateral fans to drive said bugs onto the floor; folding advance blades adjustably arranged to separate the plants; a reciprocating roller to traverse the floor and crush the bugs, and a drive-wheel arranged by means of intermediate mechanism to operate said fans and roller, substantially as shown and described.

In testimony that I claim the above I hereunto set my hand.

DAVID D. KIMBERLIN.

In presence of—
C. P. HUMPHREY,
C. E. HUMPHREY.